United States Patent [19]

Oyama

[11] 4,107,761
[45] Aug. 15, 1978

[54] ELECTROLYTIC CAPACITOR AND ELECTROLYTE

[75] Inventor: Makoto Oyama, Hitachi, Japan

[73] Assignee: United Chemi-Con, Inc., Rosemont, Ill.

[21] Appl. No.: 781,847

[22] Filed: Mar. 28, 1977

[51] Int. Cl.$^2$ .............................................. H01G 9/02
[52] U.S. Cl. ...................... 361/433; 29/570; 252/62.2
[58] Field of Search .............. 252/62.2; 361/433; 29/570

[56] References Cited

U.S. PATENT DOCUMENTS

| | | | |
|---|---|---|---|
| 2,826,724 | 3/1958 | Lilienfeld | 361/433 |
| 2,886,528 | 5/1959 | Myers | 252/62.2 |
| 2,941,929 | 6/1960 | Lilienfeld | 252/62.2 X |
| 3,351,823 | 11/1967 | Jenny | 361/433 |
| 3,541,399 | 11/1970 | Kruishoop | 252/62.2 X |
| 3,580,845 | 5/1971 | Dahle | 252/62.2 |
| 3,585,459 | 6/1971 | Hills et al. | 252/62.2 X |
| 3,646,403 | 2/1972 | Dunkl | 252/62.2 X |
| 3,670,212 | 6/1972 | Anderson | 252/62.2 X |

FOREIGN PATENT DOCUMENTS 36-20,622 10/1951 Japan.

*Primary Examiner*—Jack Cooper
*Attorney, Agent, or Firm*—Schovee & Boston

[57] ABSTRACT

An electrolytic capacitor containing a novel electrolyte comprising solute selected from ammonium pentaborate and its mixture with boric acid and solvent comprising ethylene glycol, at least one ketone selected from 2,4-pentanedione, 2,4-hexanedione, 5-hydroxy-2-pentanone, and cyclohexanone, and their mixtures with other polar organic solvents. The electrolyte may also contain added water.

12 Claims, No Drawings

ELECTROLYTIC CAPACITOR AND ELECTROLYTE

BACKGROUND OF THE INVENTION

This invention relates to high voltage electrolytic capacitors utilizing metal electrodes, particularly aluminum foil electrodes, in the presence of an electrolyte comprising ethylene glycol, ammonium pentaborate and its mixtures with boric acid. Such type of electrolyte is commonly referred to as a glycol-borate electrolyte. Glycol-borate electrolytes are well-known in the art and are described in U.S. Pat. Nos. 3,646,403; 3,351,823; and 3,302,071. In these electrolytes, some of the dissolved borates react with the glycol to form glycol-borate esters and water. The concentration of water from this reaction may be about 10% by weight of electrolyte, but can be adjusted to a desired level by heating the electrolyte or by adding water. Use of such glycol-borate electrolytes usually have been limited to operating conditions of approximately 450 volts and 85° C.

Typically, an electrolytic capacitor comprises metal anode and cathode members separated by a paper spacer impregnated with an electrolyte. The anode and cathode are provided with tabs for making electrical connections thereto. The electrolytic capacitor is usually constructed in the form of a roll enclosed in a leak-proof outer container. Such a typical electrolytic capacitor construction is taught in the drawing of U.S. Pat. No. 3,646,403.

SUMMARY OF THE INVENTION

The present invention relates to an improved ethylene glycol borate electrolyte and to electrolytic capacitors utilizing such an electrolyte, wherein the improvememnt comprises including in the electrolyte from about 2,8% to about 30% by weight based on the total weight of the electrolyte, of at least one ketone selected from 2,4-pentanedione, 2,4-hexanedione, 5-hydroxy-2-pentanone, and cyclohexanone.

The presence of one of the above ketones in a standard glycol-borate electrolyte permits the operation of electrolytic capacitors containing the ketone-containing electrolyte at high voltage and high temperature operating conditions without rupturing even in the presence of added water while providing acceptable levels of resistivity and low leakage currents.

The improved electrolyte of this invention is particularly useful in the presence of aluminum foil electrodes because of its non-corrosive properties, especially at elevated temperatures and high voltages. It is known in the art that it is difficult to produce electrolytic capacitors of such type which will provide stable performance characteristics at voltages above 350V and at high temperatures, i.e. from 85° to 110° C. The improved electrolyte hereof provides a means for making electrolytic capacitors utilizing aluminum foil electrodes and having improved capacitor performance characteristics under severe operating conditions such as 500V at 85° C, or 450V at 110° C. For example, leakage currents (LC) after high temperature storage (shelf-life) conditions of electrolytic capacitors made according to this invention were found to be less than those of an electrolytic capacitor containing an aluminum foil anode and a standard glycol-boric acid-ammonium pentaborate electrolyte. The series resistance of the novel capacitors was found to be of an acceptable level. Moreover, the frequency of capacitor ruptures for novel capacitors made according to the invention has been found to be zero compared to 50% to 100% for standard prior art capacitors of the type described above.

In general, electrolyte of this invention comprises the following ingredients in parts per 100 parts of the total weight of the named ingredients, all parts being by weight:

| Ingredient | Parts |
| --- | --- |
| Ethylene glycol | 30 to 70 |
| Other polar organic solvent | 0 to 40 |
| Water, added | 0 to 10 |
| Boric acid | 0 to 20 |
| Ammonium pentaborate | 10 to 30 |
| Ketone selected from 2,4-pentanedione, 2,4-hexanedione, 5-hydroxy-2-pentanone, cyclohexanone, and mixtures of two or more thereof. | 2.8 to 30 |
| Total Parts | 100 |

DESCRIPTION OF THE PREFERRED EMBODIMENT

The ingredients of the electrolytes of this invention are known compounds. The solvent portion of the electrolyte consists essentially of ethylene glycol and an equal or lesser amount of at least one of specified ketones, namely, 2,4-pentanedione, 2,4-hexanedione, 5-hydroxy-2-pentanone, and cyclohexanone. The solvent preferably also contains at least one polar organic solvent other than ethylene glycol and a minor amount of water, added to reduce resistivity.

The ketone ingredient of the solvent portion of the electrolyte hereof is a ketone having a boiling point above about 110° C which is compatible with the other ingredients of the electrolyte, stable under high voltage and temperature conditions under which the electrolyte is operated and non-attacking toward the aluminum or other metal foil electrodes with which it is in contact in the electrolytic capacitor under the operating and storage conditions to which the capacitor is subjected. Ketones which have been found to have these properties for practice of the present invention are: 2,4-pentanedione, 2,4-hexanedione, and 5-hydroxy-2-pentanone, and cyclohexanone, and mixtures of two or more thereof.

Preferably, one of the acyclic ketones, 2,4-hexanedione, 5-hydroxy-2-pentanone, or 2,4-pentanedione (also known as acetylacetone and referred to as such herein) is used to practice the invention.

Ketones other than those described above which were tested in making this invention have not been found satisfactory for use in the electrolytic capacitor of this invention due to certain failings, such as their inability to prevent rupture of the capacitor.

The solvent portion of the electrolyte can also contain other compatible solvents used in electrolytic capacitors having glycol-borate electrolytes. Such other solvents are polar solvents and include, for example, diethylene glycol, glycerine, ethers of ethylene glycol (monomethyl, monoethyl, monobutyl) and butyrolactone.

Water may be added to the electrolyte composition to reduce the resistivity and to improve the low temperature performance of the electrolytic capacitor. However, in some cases the water formed by the chemical reaction of the glycol and boric acid in the electrolyte will be found adequate for this purpose.

The solute portion of the electrolyte preferably comprises boric acid and ammonium pentaborate in admixture and their reaction products. In some cases ammonium pentaborate may advantageously be used alone as the solute. These ingredients are well-known in their use in glycol-borate electrolytes for electrolytic capacitors, as described, for example, in U.S. Pat. No. 3,646,403.

The electrolyte can also contain minor portions of other ingredients usually added to glycol-borate electrolytes for known specific purposes, such as, ammonium phosphate, ammonium salicylate, ammonium adipate or the corresponding acids.

The electrode material to which this invention particularly relates is an aluminum foil anode of the type conventionally made for, and used in electrolytic capacitors. It is to be understood that the electrolyte of this invention can also be used in the presence of other metal foils used in electrolytic capacitors, including tantalum.

The invention is further illustrated in the examples which follow, but is not limited thereto:

EXAMPLE 1

The following three electrolytes A, B and C were prepared as shown:

| Ingredients | | A | B | C |
|---|---|---|---|---|
| Ethylene glycol | (EG) | 15 ml | 15 | 15 |
| Butyrolactone | (BL) | 15 ml | 15 | 15 |
| Boric acid | (BA) | 2.5 gm | 2.5 | 2.5 |
| Ammonium pentaborate | (ApB) | 7.5 gm | 7.5 | 7.5 |
| Water, added | ($H_2O$) | 2.1 ml | 2.1 | 2.1 |
| Acetylacetone* | (AcAc) | 0 ml | 2.0 | 4.0 |

*2,4-pentanedione

The breakdown voltages of these electrolytes were measured in capacitors (13 mm diameter × 30 mm long) made in a conventional way with 685V etched aluminum anode foil and impregnated with one of the above electrolytes and found to be as follows:

| Electroylte | Voltage at Breakdown |
|---|---|
| A | 510V |
| B | 525V |
| C | 550V |

Thus, the presence of acetylacetone in the electrolytes B and C is shown to have increased the level of breakdown voltage, compared to that of electrolyte A.

Other capacitors made with electrolytes A, B and C were placed on shelf test. The initial leakage currents at 500V, and the leakage currents after shelf test at 85° C for 100 hours, were as follows:

| Electrolyte | Initial | After Shelf Test |
|---|---|---|
| A | 3.1 μA | 134 μA |
| B | 1.2 μA | 23 μA |
| C | 1.4 μA | 22 μA |

Thus, the presence of acetylacetone in the electrolytes B and C also is shown to have reduced the leakage current substantially, compared to that of electrolyte A.

EXAMPLE 2

The following three electrolytes D, E and F were prepared and impregnated into capacitors having aluminum foil anodes as in Example 1. The performances of the capacitors were then determined and results were obtained as shown:

| Ingredients | D | E | F |
|---|---|---|---|
| Methyl Cellosolve (MC) | 12 ml | 12 | 12 |
| EG | 18 ml | 16 | 14 |
| BA | 3.0 gm | 3.0 | 3.0 |
| ApB | 7.5 gm | 7.5 | 7.5 |
| $H_2O$, added | 2.1 ml | 2.1 | 2.1 |
| AcAc | 0 ml | 2.0 | 4.0 |
| Initial leakage current at 500V | 48 μA | 6 μA | 2 μA |
| Leakage current after 85° C shelf test, 120 hrs.: | 1840 μA | 720 μA | 28 μA |

Thus, the addition of acetylacetone into electrolytes E and F made with a mixed solvent of Methyl Cellosolve (tradename for monomethyl ether of ethylene glycol), ethylene glycol and water is shown to have reduced the leakage currents of the capacitors substantially, compared to those of capacitor D.

EXAMPLE 3

Capacitors were made with the following three electrolytes G, H and I. The capacitors included aluminum foil anodes as described in Example 1. The capacitors were then aged at 450V, 110° C with the following results:

| Ingredients | G | H | I |
|---|---|---|---|
| EG | 100ml | 95 | 85 |
| BA | 25gm | 25 | 25 |
| ApB | 25gm | 25 | 25 |
| $H_2O$, added | 8ml | 8 | 8 |
| AcAc | 0ml | 5 | 15 |
| Number of capacitors ruptured during ageing: | 3/3* | 0/3** | 0/3 |

*3 of 3 ruptured;
**none of 3 ruptured.

Thus, presence of acetylacetone in the electrolytes H and I reduced the possibility of ruptures of capacitors during ageing by 100%, compared to that of electrolyte G.

EXAMPLE 4

Capacitors were made with the following three electrolytes J, K and L, including in the capacitors aluminum foil anodes as described in Example 1. The capacitors were aged at 400V, 100° C. with the following results:

| Ingredients | J | K | L |
|---|---|---|---|
| EG | 100ml | 95 | 75 |
| BA | 25gm | 25 | 25 |
| ApB | 25gm | 25 | 25 |
| $H_2O$, added | 8ml | 8 | 8 |
| Cyclohexanone (CH) | 0ml | 5 | 25 |
| Number of capacitors ruptured during ageing: | 5/5 | 0/5 | 0/5 |

Thus, presence of cyclohexanone in the electrolytes K and L is shown to have reduced the possibility of ruptures of capacitors during ageing by 100%, compared to that of electrolyte J.

EXAMPLE 5

Capacitors were made using aluminum foil anodes described in Example 1 and impregnated with the following electrolytes M (according to invention) and N (standard glycol-borate electrolyte). The capacitors were then subjected to load and shelf tests at 110° C for 1000 hours. (To avoid ruptures with electrolyte N, the electrolyte was heated to 142° C to get resistivity of about 2.5 Kohm-cm at 25° C.). The following results were obtained;

| Ingredients | M | N |
|---|---|---|
| EG | 75ml | 100 |
| BA | 30gm | 25 |
| ApB | 30gm | 25 |
| H₂O, added | 8ml | 8 |
| CH | 25ml | 0 |
| Ammonium adipate | 3gm | 0 |
| Resistivity at 25° C Kohm-cm | 1.47 | 2.46 |
| Initial leakage current, μA* | 0.3 | 8.8 |
| Initial Capacitance, μF** | 5.95 | 6.06 |
| Initial Dissipation factor, % | 4.60 | 8.96 |
| After 1000 hours load test at 110° C, 400V: | | |
| Leakage current, μA | 0.3 | 0.6 |
| Capacitance, μF | 6.13 | 6.02 |
| Dissipation Factor, % | 6.96 | 7.87 |
| After 1000 hours shelf test at 110° C: | | |
| Leakage current, μA | 143 | 258 |
| Capacitance, μA | 5.97 | 6.04 |
| Dissipation factor, % | 7.28 | 7.04 |

*microamperes;
**microfarads

Thus, the presence of cyclohexanone in the electrolyte M is shown to have substantially reduced the current leakage initially and also after both the load and shelf tests, compared to the standard glycol-borate electrolyte N.

EXAMPLE 6

The advantageous presence of ketones of this invention over closely-related ketones, each used in electrolytes in electrolytic capacitors containing aluminum foil anodes as described in Example 1, and subjected to a load test at 85° C, 500V, is shown by the following results obtained with the following electrolytes, O, P, Q, R, and S:

| Ingredients | O | P | Q | R | S |
|---|---|---|---|---|---|
| EG | 46.7ml | 46.4 | 46.4 | 46.4 | 46.7 |
| BL | 46.7ml | 46.4 | 46.4 | 46.4 | 46.7 |
| BA | 10 gm | 10 | 10 | 10 | 10 |
| ApB | 25 gm | 25 | 25 | 25 | 25 |
| H₂O, added | 7 ml | 7 | 7 | 7 | 7 |
| Ketone (as shown) | AcAc 6.6ml | 2,3-Hexane dione 7.3ml | 2,4-hexane dione 7.3ml | 2,5-hexane dione 7.3ml | 1-Benzoyl acetone 8.4 gm |
| Number of capacitors ruptured during ageing: | 0/2 | 1/2 | 0/2 | 1/2 | 1/2 |

Thus, only use of ketones of this invention, acetylacetone (AcAc) in electrolyte O, and use of 2,4-hexanedione, in electrolyte Q, as disclosed herein, are shown to be suitable for use to prevent rupturing of electrolytic capacitors of the above ketone-containing glycol-borate type compositions to which water had been added.

EXAMPLE 7

Monoketones were evaluated in the following electrolytes T, U, and V which were used to make capacitors having aluminum foil anodes as described in Example 1. The capacitors were aged at 400V, 110° C. The following results were obtained:

| Ingredients | T | U | V |
|---|---|---|---|
| EG | 100 ml | 85 | 85 |
| BA | 25 gm | 25 | 25 |
| ApB | 25 gm | 25 | 25 |
| H₂O, added | 8 ml | 8 | 8 |
| Ketone | 0 | 3-hydroxy-2-butanone 15 ml | 5-hydroxy-2-pentanone 15 ml |
| Number of capacitors ruptured during ageing: | 7/12 | 4/4 | 0/8 |

Thus, 5-hydroxy-2-pentanone, one of the ketones of this invention, is shown to have substantially reduced the possibility of rupture of capacitors made with electrolyte V, compared to a standard glycol-borate electrolyte T, and an electrolyte made with a monoketone not of this invention.

EXAMPLE 8

The use of diacetone alcohol as a solvent in an electrolyte for an electrolytic capacitor is taught in Japanese Patent Publication No. 36-20622 issued Oct. 28, 1951 to Towa Chikudenki Co. Ltd.

The chemical structure of diacetone alcohol is:

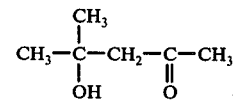

The chemical structure of 5-hydroxy-2-pentanone (used in electrolyte V, Example 7, above) is

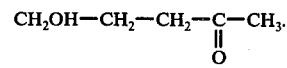

Glycol-borate electrolyte containing diacetone alcohol was found unsuitable for the purpose of the present invention because of its lack of thermal stability. Its initial boiling point of 125° fell to 85° C after 250 hours of storage at 85° C.

In contrast to the instability of the diacetone alcohol, the ketones of the present invention were found stable in their use in the electrolytes and in the electrolytic capacitors of this invention at temperatures up to 110° C.

The electrolytes of the present invention have advantageous properties such as low viscosity, low resistivity, good low temperature performance characteristics and high breakdown voltage characteristics at high temperatures. The electrolytic capacitors made with electrolytes made according to the invention have substantially less current leakage and greatly improved freedom from rupturing.

It is to be understood that the foregoing examples are illustrative only and that changes can be made in the ingredients and proportions discussed without departing from the scope of the invention as defined in the following claims.

What is claimed is:

1. An electrolyte adapted to be incorporated into an electrolytic capacitor for use at elevated temperatures of from about 85° to 110° C. and voltages up to 500 V in the presence of a metal foil electrode, said electrolyte consisting essentially of per 100 parts by weight:

| Ingredient | Parts |
| --- | --- |
| Ammonium pentaborate | 10 to 30 |
| Boric acid | 0 to 20 |
| Ethylene glycol | 30 to 70 |
| Water | 0 to 10 |
| Ketone selected from 2,4-pentanedione, 2,4-hexanedione, cyclohexanone, and mixtures thereof | 2.8 to 30 |
| Polar organic solvent selected from at least one of butyrolactone, monomethyl ether of ethylene glycol, monoether ether of ethylene glycol, monobutyl ether of ethylene glycol | 0 to 10 |

2. An electrolyte according to claim 1 wherein said ketone is 2,4-pentanedione.

3. An electrolyte according to claim 1 wherein said ketone is 2,4-hexanedione.

4. An electrolyte according to claim 1 wherein said ketone is cyclohexanone.

5. An electrolytic capacitor having metal electrodes including an anode and a cathode separated from each other by spacer means impregnated with an electrolyte, said anode being an aluminum or tantalum metal foil anode and said electrolyte consisting essentially of per 100 parts by weight:

| Ingredient | Parts |
| --- | --- |
| Ammmonium pentaborate | 10 to 30 |
| Boric acid | 0 to 20 |
| Ethylene glycol | 30 to 70 |
| Water | 0 to 10 |
| Ketone selected from 2,4-pentanedione, 2,4-hexanedione, cyclohexanone, and mixtures thereof | 2.8 to 30 |
| Polar organic solvent selected from at least one of butyrolactone, monomethyl ether of ethylene glycol, monoethyl ether ether of ethylene glycol, monobutyl ether of ethylene glycol | 0 to 10 |

6. An electrolytic capacitor according to claim 5 wherein said ketone is 2,4-pentanedione.

7. An electrolytic capacitor according to claim 5 wherein said ketone is 2,4-hexanedione.

8. An electrolyte according to claim 5 wherein said ketone is cyclohexanone.

9. An electrolytic capacitor according to claim 5 wherein said anode is an aluminum foil anode.

10. An electrolytic capacitor according to claim 5 wherein the solvent portion of said electrolyte consists essentially by volume of from 75 to 95% of ethylene glycol and from 5 to 25% of at least one of said ketones.

11. An electrolytic capacitor according to claim 5 wherein the ketone is an acyclic ketone selected from 2,4-pentanedione and 4-hexanedione.

12. An electrolytic capacitor as in claim 5 wherein said anode is a tantalum foil anode.

* * * * *

UNITED STATES PATENT AND TRADEMARK OFFICE
CERTIFICATE OF CORRECTION

PATENT NO. : 4,107,761
DATED : Aug. 15, 1978
INVENTOR(S) : Makoto Oyama

It is certified that error appears in the above-identified patent and that said Letters Patent are hereby corrected as shown below:

In Claim 1, in the list of Ingredients, line 15, delete "monoether" and substitute therefor--monoethyl--.

In Claim 11, line 35, after "and" insert--2,--.

Signed and Sealed this

Seventeenth Day of April 1979

[SEAL]

Attest:

RUTH C. MASON
Attesting Officer

DONALD W. BANNER
Commissioner of Patents and Trademarks